United States Patent Office 3,808,330
Patented Apr. 30, 1974

3,808,330
METHOD FOR TREATMENT OF
HYPERTENSIVE DISEASE
Shinzaburo Ohtake, Tokyo, and Shunji Igarashi, Tokorozawa, Japan, assignors to Eisai Co., Ltd., Tokyo, Japan
Filed Nov. 1, 1972, Ser. No. 302,921
Claims priority, application Japan, July 13, 1972,
47/69,545
Int. Cl. A61k 27/00
U.S. Cl. 424—94
7 Claims

ABSTRACT OF THE DISCLOSURE

Therapeutical treatment of hypertensive disease by oral or parenteral administration of ubiquinone $5n$ which are also known as "coenzyme $Qn$." The compounds when administered alone or in a form of therapeutical preparations exhibit an excellent hypotensive activity without injurious side effects.

BACKGROUND OF THE INVENTION

Figure 1:
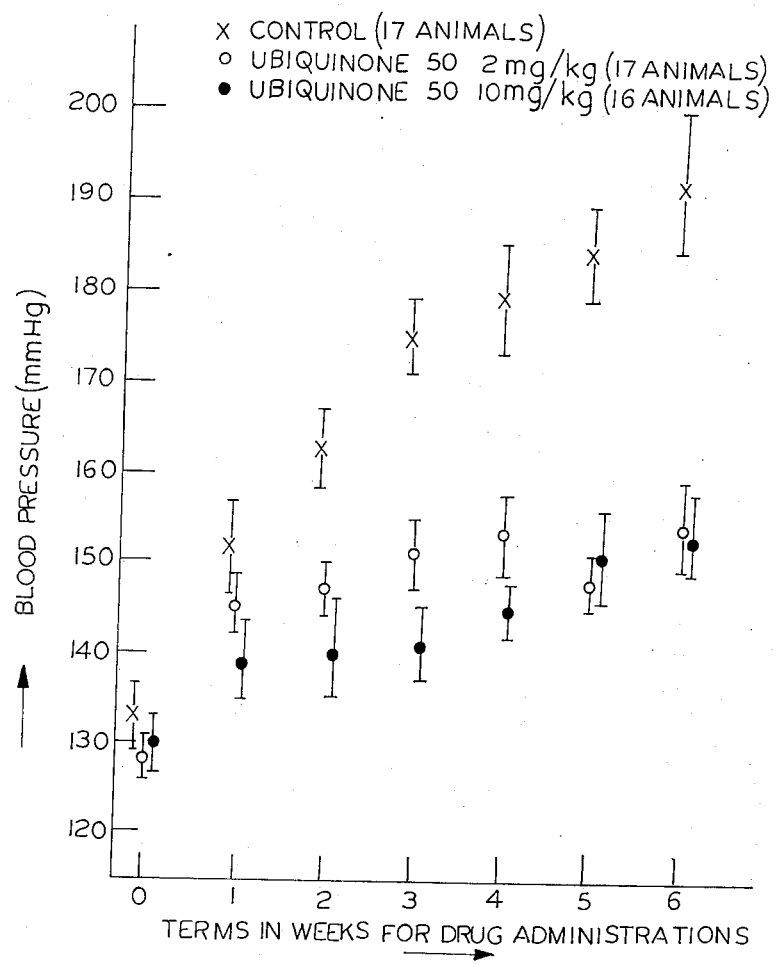

This invention relates to a method for treating hypertensive disease by administering ubiquinones represented by the chemical formula.

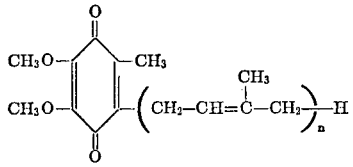

wherein $n$ is an integer of 9 or 10.

The abovementioned particular ubiquinone compounds will be hereinafter referred to "ubiquinone $5n$" wherein $n$ has the same meaning as that aforementioned. Ubiquinone $5n$ are also called "coenzyme $Qn$."

It is obvious that ubiquinone $5n$ in view of the above formula embraces two particular compounds, one of which is ubiquinone 45 wherein $n$ in the formula is the integer of 9, and the other is ubiquinone 50 where $n$ in the formula is the integer of 10.

Hypertensive disease is a disorder which is characterized by a sustained elevation of blood pressure with eventual appearance of cardiac, renal, retinal and cerebral vascular complications. Hypertension arises from various causes and nevertheless true mechanism of its causation remains unknown.

Comments on some known methods for treatment of hypertension

Although numerous studies hithertofor have been put into practice and many drugs have been provided therefor, it has not been found as yet a decisive method recommendable for treatment and/or prevention of this disease. There might be a potent curable drug effective for depressing hypertension, such drug would accompany with serious harmful side disease.

Reserpine, one of the rauwolfia alkaloid widely used for the treatment of hypertension disease, usually takes several weeks before manifestation of its full effect, for example, when the same is successively administered per os.

Although reserpine is relatively nontoxic, a variety of undesirable side effects such as nasal congestion, diarrhea, lethargy and drowsiness are relatively common during a course of successive administrations thereof.

Diuretic drugs such as hydrochlorothiazide have also been used for the treatment of hypertension in combination with other known hypotensive drugs. However, there occur some injurious side effects due to unbalances of fluid and electrolytes, and also hyperuricemia during a long-term administration of said compound and its congener.

Hydrazine preparations possess a potent hypotensive activity. However, dosage of the preparations frequently induce headache, nausea and tachycardia. Administration of these preparations should therefore be avoided for the patients suffering from limited cardiac reserve, angina or known coronary artery disease. A large dose of hydrazine may cause "collagen disease" resembling disseminated lupus erythematosus.

Methyl-DOPA preparation, i.e., DOPA-decarboxylase inhibitor, can also be used as potent hypotensive. The compound, when successively administered, also gives rise to undesirable side effects such as vertigo, mental depression, paresthesia and Parkinsonism.

As is obvious from the above considerations, use of the hitherto-known medicines for the treatment of hypertensive diseases, as a whole, is all limitative by their toxicity, injurious side effects, insufficient effectiveness and/or development of tolerance.

SUMMARY OF THE INVENTION

It has unexpectedly been found that ubiquinone $5n$ including ubiquinones 45 and 50 possesses an effective hypotensive activity and are utilizable for treatment of hypertension without undesirable side effects. It has further been found that ubiquinone 50 is particularly preferable for this purpose.

Accordingly, a principal object of the present invention is to provide a method for therapeutical treatment of hypertension by administering ubiquinone $5n$.

Ubiquinone $5n$ are the substances which are found widely in animal and plant organs and also in microorganisms such as yeast and in particular in mitochondria of these sources.

Ubiquinone $5n$ possess very low acute toxicity. Oral $LD_{50}$ for mice, for example, is greater than 4000 mg./kg. $LD_{50}$ for mice exceeds 500 mg./kg. when it is given intramuscularly, subcutaneously and intravenously. Toxic manifestations are not observed in rats receiving per os 1000 mg./kg. for 5 weeks or 600 mg./kg. for 26 weeks, and no gross or histologic changes are observed in the various organs and tissues.

Pharmacological activities of ubiquinone $5n$ in the central or peripheral nervous system, blood coagulation system and so on are found to be low.

DESCRIPTION OF THE INVENTION

The particular hypotensive activity presented by ubiquinone $5n$ was revealed by a series of the following pharmacological studies on animals.

(1) Effects of ubiquinone 50 on experimental hypertension of rats loaded with desoxy-corticosterone acetate (DOCA) and saline The development of hypertension induced experimentally in unilateral-nephrectomized rats loaded with DOCA and saline was definitely inhibited by oral administration of 2 or 10 mg./kg./day of ubiquinone 50. Namely, 16 of 17 control rats receiving only an aqueous solution of gum arabic were hypertensive, while the incidence of hypertension in the groups receiving ubiquinone 2 or 10 mg./kg. was found only in 4 of 16 animals and 2 of 16 animals respectively, after 6 weeks of the treatments with ubiquinone 50. The results of the observations are graphically shown in the accompanying FIG. 1.

(2) Effects of ubiquinone 50 on the hypertensive rats associated with regeneration of adrenal cortex after enucleation When the hypertension was established on rats two weeks after enucleation of their both adrenal glands followed by giving saline, oral administration of 10 mg./kg./day ubiquinone 50 was initiated thereto. Restoration of the elevated blood pressure to normal was attained after four weeks of the treatment. Namely, with the control rats receiving only an aqueous solution of gum arabic, 7 of 13 animals were found hypertensive of higher than 160 mm. Hg, while with the group treated with ubiquinone 50, only 3 of 28 animals were found hypertensive.

30 mg./day dose of ubiquinone 50 in capsule was consecutively administered per os for 4 weeks to each of 12 patients of essential hypertension and of 4 patients of renal hypertension. The resulting therapeutical effects of the doses were evaluated on the maximal or systolic and minimal or diastolic blood pressures as well as the fluctuations of the concentrations of sodium and potassium ions in the blood, which had been measured twice after and before each of the medications.

The results of the observations are tabulated below.

TABLE I

| No. | Ages | Sex | Diagnosis | Blood pressures | | | | Concentrations in blood of— | | | | Ratings |
|---|---|---|---|---|---|---|---|---|---|---|---|---|
| | | | | Before dosage | | After dosage | | Na+ (meq./l.) | | K+ (meq./l.) | | |
| | | | | Syst. | Diast. | Syst. | Diast. | Before dosage | After dosage | Before dosage | After dosage | |
| 1 | 81 | Male | Essential hypertension | 198 | 108 | 148 | 82 | 138 | 137 | 4.2 | 4.1 | ++ |
| 2 | 74 | do | do | 186 | 94 | 150 | 80 | 138 | 139 | 4.0 | 4.4 | + |
| 3 | 79 | Female | do | 172 | 100 | 149 | 84 | 138 | 136 | 3.5 | 4.0 | ++ |
| 4 | 67 | do | do | 194 | 96 | 153 | 90 | 134 | 134 | 3.5 | 3.9 | + |
| 5 | 63 | do | do | 168 | 98 | 140 | 88 | 130 | 125 | 3.3 | 3.2 | + |
| 6 | 64 | Male | do | 198 | 98 | 151 | 89 | 143 | 143 | 4.2 | 3.9 | + |
| 7 | 59 | Female | do | 197 | 100 | 156 | 90 | 132 | 130 | 4.2 | 4.2 | ++ |
| 8 | 52 | Male | do | 167 | 94 | 155 | 91 | 128 | 127 | 4.4 | 4.6 | — |
| 9 | 63 | do | do | 168 | 98 | 142 | 87 | 141 | 135 | 4.5 | 4.3 | + |
| 10 | 56 | do | do | 189 | 106 | 141 | 101 | 120 | 115 | 5.0 | 4.5 | + |
| 11 | 53 | Female | do | 203 | 105 | 162 | 92 | 133 | 132 | 4.1 | 4.0 | ++ |
| 12 | 65 | Male | do | 180 | 109 | 148 | 84 | 138 | 133 | 3.6 | 3.6 | ++ |
| 13 | 62 | do | Renal hypertension | 183 | 95 | 147 | 86 | 136 | 140 | 3.7 | 3.9 | + |
| 14 | 60 | do | do | 169 | 98 | 155 | 92 | 134 | 131 | 3.5 | 3.4 | — |
| 15 | 58 | Female | do | 178 | 96 | 144 | 80 | 141 | 135 | 3.7 | 3.8 | + |
| 16 | 72 | do | do | 198 | 105 | 150 | 97 | 132 | 131 | 4.2 | 4.3 | + |

Figure 2:
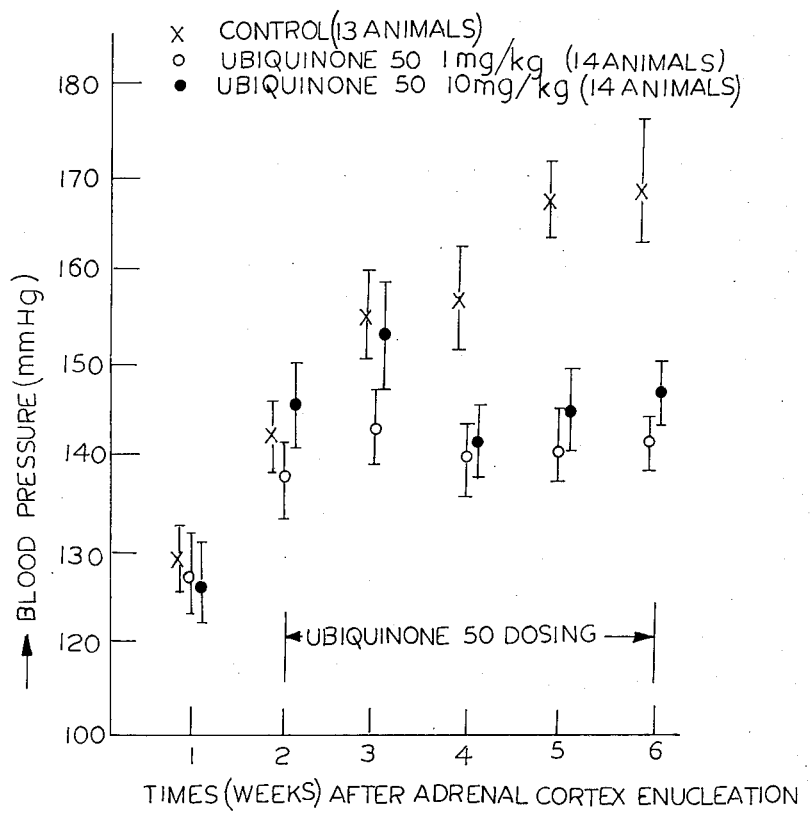

The results of the observations are graphically shown in the accompanying FIG. 2.

(3) Effects of ubiquinone 50 on Goldblatt-type hypertensive dogs

To six hypertensive (180–22 mm. Hg) dogs caused by constriction of the renal artery of one kidney followed by removal of the remainder, 10 mg./kg./day of ubiquinone 50 were administered orally for 14 consecutive days. Definite reductions of the blood pressures were observed on all of the animals. Maximal hypotensive effect (the reduction of 30 mm. Hg in average) were observed after 7 days' consecutive administrations. It was further observed a manifestation of persistent reduction of more than 20 mm. Hg in average as compared with the hypertension caused by the pretreatment, even for 11 days after the termination of the administrations. In contrast, the hypertension persisted in 4 control dogs with no ubiquinone 50.

Figure 3:
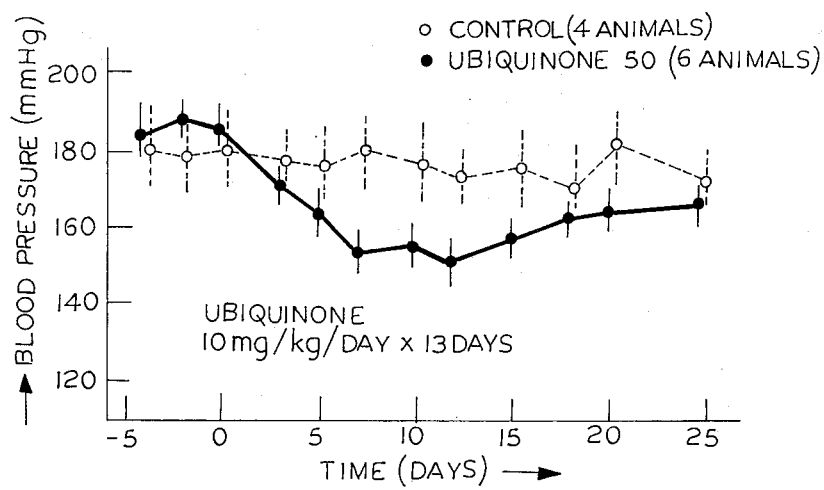

The results of the observations are graphically shown in the accompanying FIG. 3.

In the accompanying FIGS. 1–3, the plots show the statistical mean values of the blood pressures falling within the margins of the respective lines, the measurings of said blood pressures were effected with a 95% reliability on the individual groups of the animals under experiment.

From the above studies, it has been confirmed that ubiquinone 50 possesses an excellent and sustained hypotensive activity.

Physiological function of ubiquinone 50 exerting the outstanding hypotensive activity remained uncertain. It has, however, become known that ubiquinone 50 does neither affect the function of catecholamines nor the reflecttion through autonomous nervous system; and furthermore, said substance does not affect the electrolytic metabolism of kidney.

It has also been found that the hypotensive activity almost comparable to that presented by ubiquinone 50 is presented by ubiquinone 45 but not by other ubiquinones having shorter isoprenoid side chains such as ubiquinones 5, 20 and 35.

Outstanding hypotensive activity on man of ubiquinone 50 comparable to those demonstrated by the aforementioned study on animals was proved by the hereinundermentioned clinical study on the patients suffering from hypertension.

The ratings of the clinical hypotensive effect given in Table I were based on the data of systolic and diastolic blood pressures measured at the end of 4 weeks after the administrations and standardized in accordance with the following criteria (a), (b) and (c):

(a) Rating "excellent grade" marked by "++" which shows a reduction of more than 40 mm. Hg of the systolic blood pressure and at the same time a reduction of more than 10 mm. Hg of the diastolic blood pressure; or a reduction of a blood pressure of higher than 170/100 mm. Hg in comparison with a normal and optimal blood pressure level; the latter being defined by a status of lower than 150 mm. Hg of the systolic blood pressure and at the same time lower than 90 mm. Hg of the diastolic blood pressure.

(b) Rating "good grade" marked by "+," which shows a reduction of more than 40 mm. Hg of the systolic blood pressure and at the same time a reduction of less than 10 mm. Hg of the diastolic blood pressure; or a reduction of a slight hypertension falling within the range of 150–169 mm. Hg (systolic) and 90–99 mm. Hg (diastolic) to a normal and optimal blood pressure which is defined as the status of below 150 mm. Hg of systolic blood pressure and at the same time below 90 mm. Hg of diastolic blood pressure.

(c) Rating "poor grade" marked by "—," which shows a reduction of less than 40 mm. Hg of the systolic blood pressure and at the same time a reduction of less than 10 mm. Hg of the diastolic blood pressure.

The ratings given in Table I are thus summarized and classified as follows:

Excellent grade _____ 5 patients (31.3%)
Good grade _____ 9 patients (56.2%)
Poor grade _____ 2 patients (12.5%)

According to the above classification of the ratings, it may be said that overall 87.5% of the total patients entered for the above study were notably relieved from their complaint of hypertension.

During the treatment, it was further observed that there occur no significant variations in the concentrations of sodium and potassium ions in the resumed bloods; and that there occur no injurious side effects such as orthostatic hypotension, circulatory disturbance, mental depression, lethargy and paresthesia. These side effects are occasionally accompanied when the hithertoknown hypotensive medicaments are employed for the treatment.

Ubiquinone 5n according to the present invention may be administered any of the conventional medications, for example, per os or parenteral administrations such as injections and suppository. Ubiquinone 5n may be medicated in that condition or in a form of pharmaceutical preparations in combination with liquid or solid carriers which are inert to the ubiquinone 5n and are acceptable for medical preparations. The preparations may be provided in a form of tablets, granules, powders, capsules, and buccal suppository, emulsion and ampoule for injections.

As solid carriers suitable for the abovementioned solid preparations, there may be mentioned cornstarch, lactose, talc, stearic acid, magnesium stearate, gum, etc.

Liquid mediums suitable for preparing the pharmaceutical compositions for injections and emulsions are, for example, water and vegetable oils optionally in combination with an emulsifier and/or surface active substance.

Some exemplary pharmaceutical preparations containing ubiquinone 50, but not critical, are as follows:

(1) Capsules each containing 5 mg. of ubiquinone 50 and 80 mg. of granular lactose.
(2) Ampoules of 1 ml. content for injection, each containing 10 mg. of ubiquinone 50; 80 mg. of Tween 80; a commercial surfactant; 10 mg. of benzyl alcohol; 9 mg. of sodium chloride and the remainder of distilled water for injection.

What is claimed is:

1. A method for treatment of hypertension in man comprising administration to a patient having said hypertension, a therapeutically effective amount to combat said hypertension of ubiquinone 5n having the chemical formula:

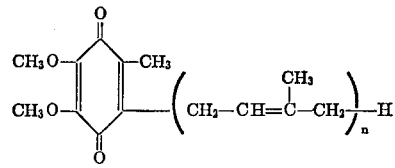

wherein $n$ is an integer of 9 or 10.

2. A method according to claim 1 wherein $n$ in the formula of ubiquinone 5n is the integer of 9.
3. A method according to claim 1 wherein $n$ in the formula of ubiquinone 5n is the integer of 10.
4. A method according to claim 1 wherein hypertension to be treated with ubiquinone 5n is essential hypertension.
5. A method according to claim 1 wherein hypertension to be treated with ubiquinone 5n is nephrogenous hypertension.
6. A method according to claim 1 which comprises orally administering a daily dose of from 0.5 to 50 mg. per kg. body weight of ubiquinone 5n to the adult.
7. A method according to claim 1 which comprises administering a daily dose of from 0.1 to 50 mg. per kg. body weight of ubiquinone 5n to the adult.

References Cited
UNITED STATES PATENTS 3,317,381   5/1967   Ume Hara _____ 424—94

JEROME D. GOLDBERG, Primary Examiner